(12) United States Patent
Nakatani et al.

(10) Patent No.: US 7,089,824 B2
(45) Date of Patent: Aug. 15, 2006

(54) TRAVELING TRANSMISSION APPARATUS FOR WORK VEHICLE

(75) Inventors: Yasunobu Nakatani, Sakai (JP); Yoshifumi Horiuchi, Sakai (JP)

(73) Assignee: Kubota Corporation, Osaka (JP)

( * ) Notice: Subject to any disclaimer, the term of this patent is extended or adjusted under 35 U.S.C. 154(b) by 67 days.

(21) Appl. No.: 10/784,119

(22) Filed: Feb. 20, 2004

(65) Prior Publication Data

US 2004/0222032 A1 Nov. 11, 2004

(30) Foreign Application Priority Data

Feb. 24, 2003 (JP) .............................. 2003-046072

(51) Int. Cl.
*F16H 57/02* (2006.01)
*F16H 57/04* (2006.01)
*F16H 61/00* (2006.01)
*B60K 17/00* (2006.01)

(52) U.S. Cl. .................. 74/730.1; 74/606 R; 180/53.4; 180/291; 180/344; 180/900

(58) Field of Classification Search .............. 74/606 R; 475/72–83; 180/53.4, 291–292, 900, 344
See application file for complete search history.

(56) References Cited

U.S. PATENT DOCUMENTS

| | | | | |
|---|---|---|---|---|
| 3,470,769 A | * | 10/1969 | Livezey | 475/24 |
| 3,969,958 A | * | 7/1976 | Miyao et al. | 475/82 |
| 4,895,049 A | * | 1/1990 | Kita et al. | 475/76 |
| 5,041,064 A | * | 8/1991 | Eickhoff et al. | 475/24 |
| 5,188,193 A | | 2/1993 | Schroeder | |
| 5,873,224 A | * | 2/1999 | Murakawa et al. | 56/11.4 |
| 6,250,414 B1 | * | 6/2001 | Sato et al. | 180/307 |
| 6,530,855 B1 | * | 3/2003 | Folsom et al. | 475/72 |
| 6,695,693 B1 | * | 2/2004 | Ho et al. | 460/6 |
| 6,874,305 B1 | * | 4/2005 | Ishimori | 56/10.8 |
| 2002/0139600 A1 | | 10/2002 | Nakatani et al. | |

FOREIGN PATENT DOCUMENTS

| | | | | |
|---|---|---|---|---|
| JP | 08219253 A | * | 8/1996 | |
| JP | 11-91379 | | 4/1999 | |
| JP | 2000-158959 | | 6/2000 | |
| JP | 2000219056 A | * | 8/2000 | |
| JP | 2000220737 A | * | 8/2000 | |
| JP | 2005042927 A | * | 2/2005 | |

* cited by examiner

*Primary Examiner*—Tisha Lewis
(74) *Attorney, Agent, or Firm*—The Webb Law Firm

(57) ABSTRACT

A traveling transmission apparatus for a work vehicle is disclosed. The apparatus includes a stepless change-speed unit receiving power from an engine, a gear transmission mechanism receiving power from the stepless change-speed unit and disposed rearwardly of the engine, a rear-wheel differential mechanism receiving power from the gear transmission mechanism and disposed rearwardly of the engine, and a transmission case accommodating the gear transmission mechanism and the rear-wheel differential mechanism and coupled to the rear of the engine. The stepless change-speed unit is disposed rearwardly of the gear transmission mechanism and rearwardly also of an output shaft of the rear-wheel differential mechanism.

6 Claims, 9 Drawing Sheets

TRAVELING TRANSMISSION APPARATUS FOR WORK VEHICLE

BACKGROUND OF THE INVENTION

1. Field of the Invention

The present invention relates to a traveling transmission apparatus for a work vehicle, including a stepless change-speed unit receiving power from an engine, a gear transmission mechanism receiving power from the stepless change-speed unit, and a rear-wheel differential mechanism for transmitting power from the gear transmission mechanism to rear wheels, the change-speed unit, the gear transmission mechanism and the differential mechanism all being disposed rearwardly of the engine.

2. Description of the Related Art

The traveling transmission apparatus of the above-noted type is known form e.g. the Japanese Patent Application "Kokai", No.: Hei. 11-91379 (see paragraphs [0054]-[0056] and FIGS. 1–3). In this traveling transmission apparatus, a change-speed case of the stepless change-speed unit is coupled via a main clutch housing to a flywheel housing portion disposed rearwardly of the engine and to the rear of this change-speed case, there is connected a traveling transmission case housing therein the gear transmission mechanism and the rear-wheel differential mechanism.

When the above-described conventional traveling transmission apparatus is mounted on a work vehicle, for effecting e.g. a maintenance operation of a hydraulic circuit of the stepless change-speed unit, this operation was difficult because of the poor accessibility to the stepless change-speed unit from the outside of the vehicle body. Further, regarding a desire to dispose the engine and the traveling transmission unit in a compact manner in the vicinity of the rear axle, the above construction cannot fully meet the desire because of a significant distance separating between the engine and the rear-wheel differential mechanism.

SUMMARY OF THE INVENTION

In view of the above, a primary object of the present invention is to provide a traveling transmission apparatus which may be disposed in a compact manner in the vicinity of the rear axle when the engine, the stepless change-speed unit and the transmission case are coupled to each other to be mounted as a single structure on the work vehicle and which facilitates e.g. maintenance of the stepless change-speed unit.

For accomplishing the above-noted object, according to the present invention, there is proposed a traveling transmission apparatus for a work vehicle, comprising a stepless changes-speed unit receiving power from an engine, a gear transmission mechanism receiving power from the stepless change-speed unit and disposed rearwardly of the engine, a rear-wheel differential mechanism receiving power from the gear transmission mechanism and disposed rearwardly of the engine, and a transmission case accommodating the gear transmission mechanism and the rear-wheel differential mechanism and coupled to the rear of the engine, wherein the stepless change-speed unit is disposed rearwardly of the gear transmission mechanism and rearwardly also of an output shaft of the rear-wheel differential mechanism.

With the above construction, the transmission case accommodating the gear transmission mechanism and the rear-wheel differential mechanism is coupled to the rear of the engine and the stepless change-speed unit is mounted at a position located rearwardly of the gear transmission mechanism and rearwardly also of the output shaft of the rear-wheel differential mechanism. As a result, the engine, the transmission case and the stepless change-speed unit are coupled together to form a single structure and the stepless change-speed unit is disposed at the rearmost portion of this structure. Accordingly, this construction improves access to the stepless change-speed unit from the rear side of the vehicle body. Further, as the stepless change-speed unit is disposed rearwardly of the output shaft of the rear-wheel differential mechanism, compared with the conventional transmission apparatus described above, the distance between the engine and the rear-wheel differential mechanism is reduced by an amount corresponding to the length of the stepless change-speed unit.

Therefore, this further improves the accessibility to the stepless change-speed unit for its maintenance and also achieves compact arrangement of the engine and the traveling transmission apparatus in the vicinity of the rear-wheel axle.

According to one preferred embodiment of the present invention, the stepless change-speed unit is constructed as an HST (hydrostatic stepless transmission) and a port block for the HST is detachably secured to an end of a rear opening of the transmission case for closing this opening. With this construction, by detaching the port bock from the transmission case, an oil passage for the HST becomes separated from the transmission case, thus facilitating its maintenance. Further, the port block acts also as a lid for the rear opening of the transmission case.

According to another preferred embodiment, the HST includes one hydraulic pump and first and second hydraulic motors, the hydraulic pump and the first hydraulic motor being attached to an inner face of the port block, the second hydraulic motor being attached to an outer face of the port block. With this, the hydraulic pump and the first hydraulic motor are housed in the transmission case, so that an HST case can be formed small just enough to substantially cover the second hydraulic motor. Further, as the hydraulic pump and the first and second hydraulic motors can be attached to the port block provided independently of the transmission case, the assembly operation of these hydraulic units is facilitated.

Further and other features and advantages of the present invention will become apparent upon reading the following detailed disclosure of the present invention with reference to the accompanying drawings.

DESCRIPTION OF THE PREFERRED EMBODIMENTS

Figure 1:
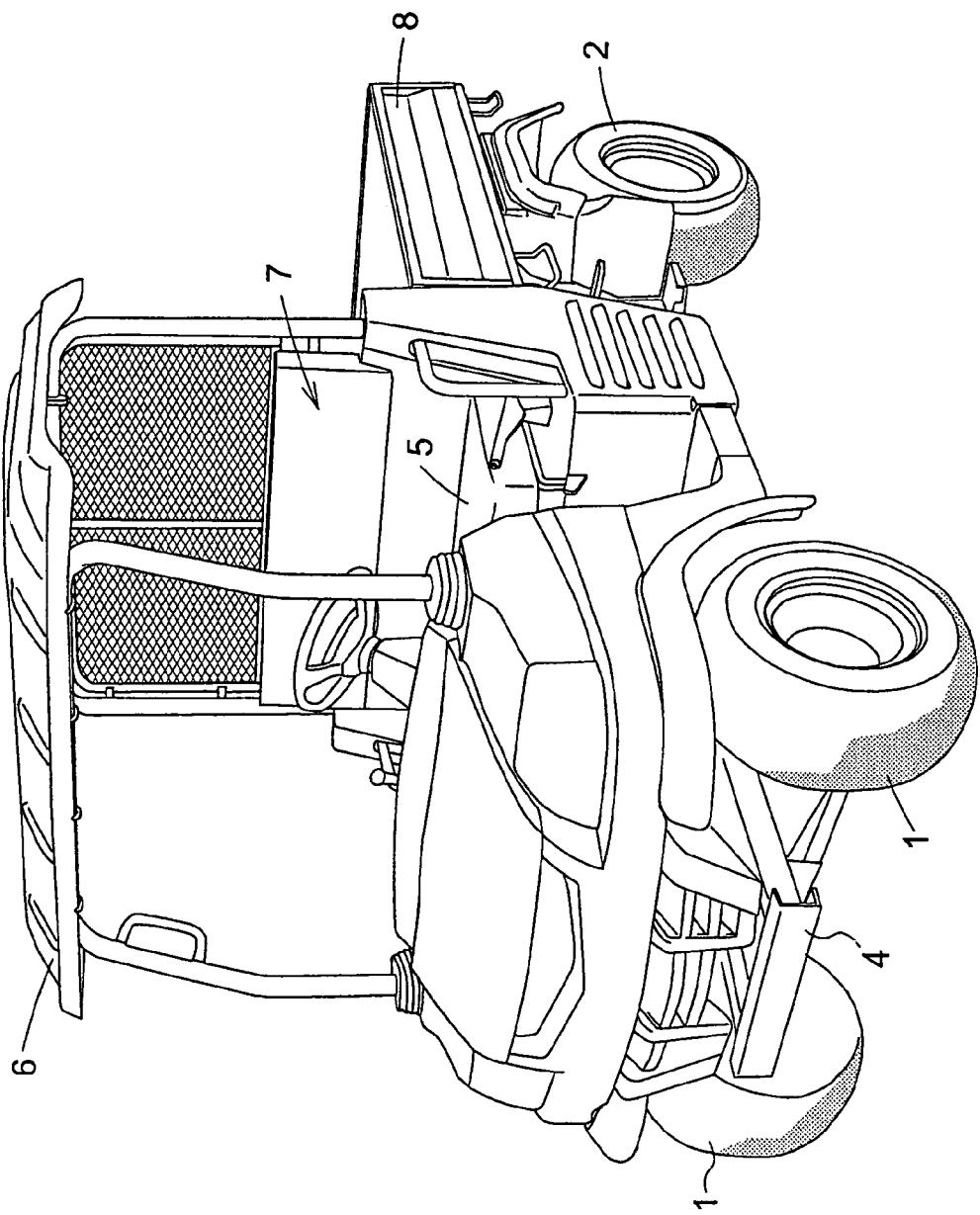
FIG. 1 is a perspective view showing a work vehicle in its entirety.
Figure 2:
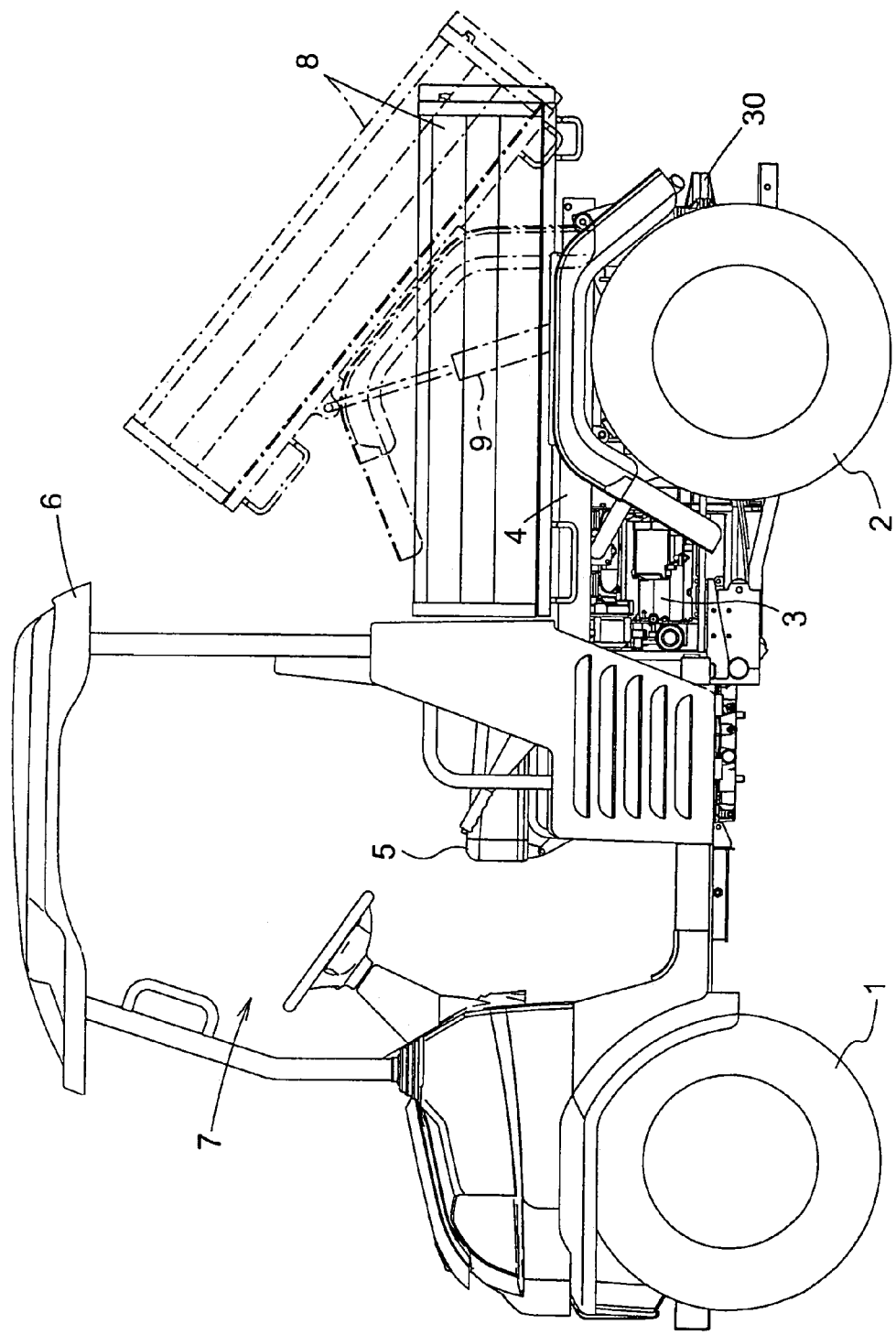
FIG. 2 is a side view of the entire work vehicle.
Figure 3:
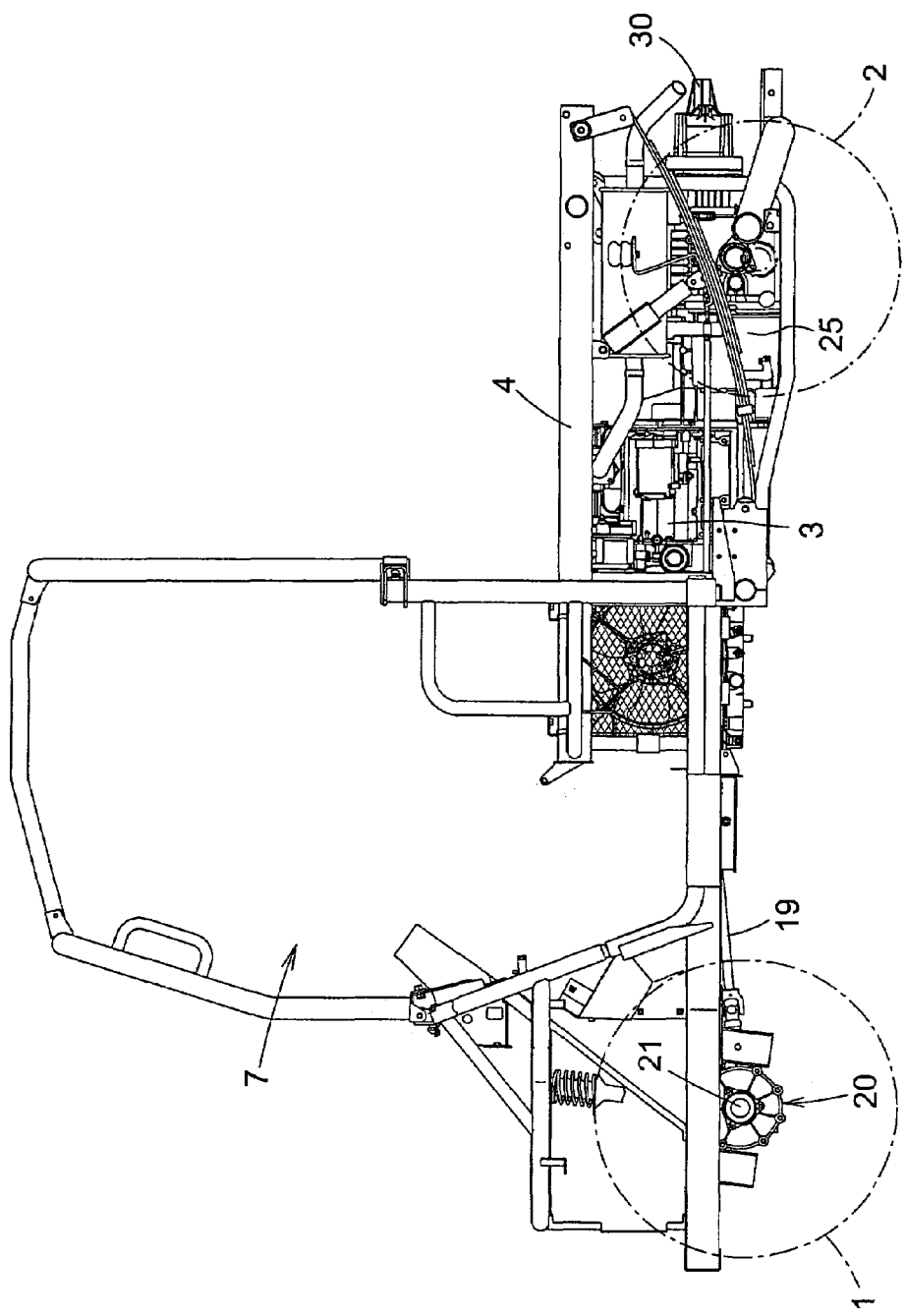
FIG. 3 is a side view of a vehicle body frame.

As shown in FIGS. 1, 2 and 3, a work vehicle using a traveling transmission apparatus of the invention includes a pair of right and left steerable front wheels 1 having pneumatic tires and a pair of right and left rear wheels 2 having pneumatic tires. An engine 3 for driving the front and rear wheels 1, 2 is mounted on a vehicle body frame 4, which frame mounts, at a front area thereof, a driver's section 7 including a driver's seat 5 and a sunshade 6 and mounts, at a rear area thereof, a carrier 8. This carrier 8 is vertically pivotable, by means of a dump cylinder 9, about an axis located at the rear portion of the carrier and extending transverse to the vehicle body.

Figure 4:
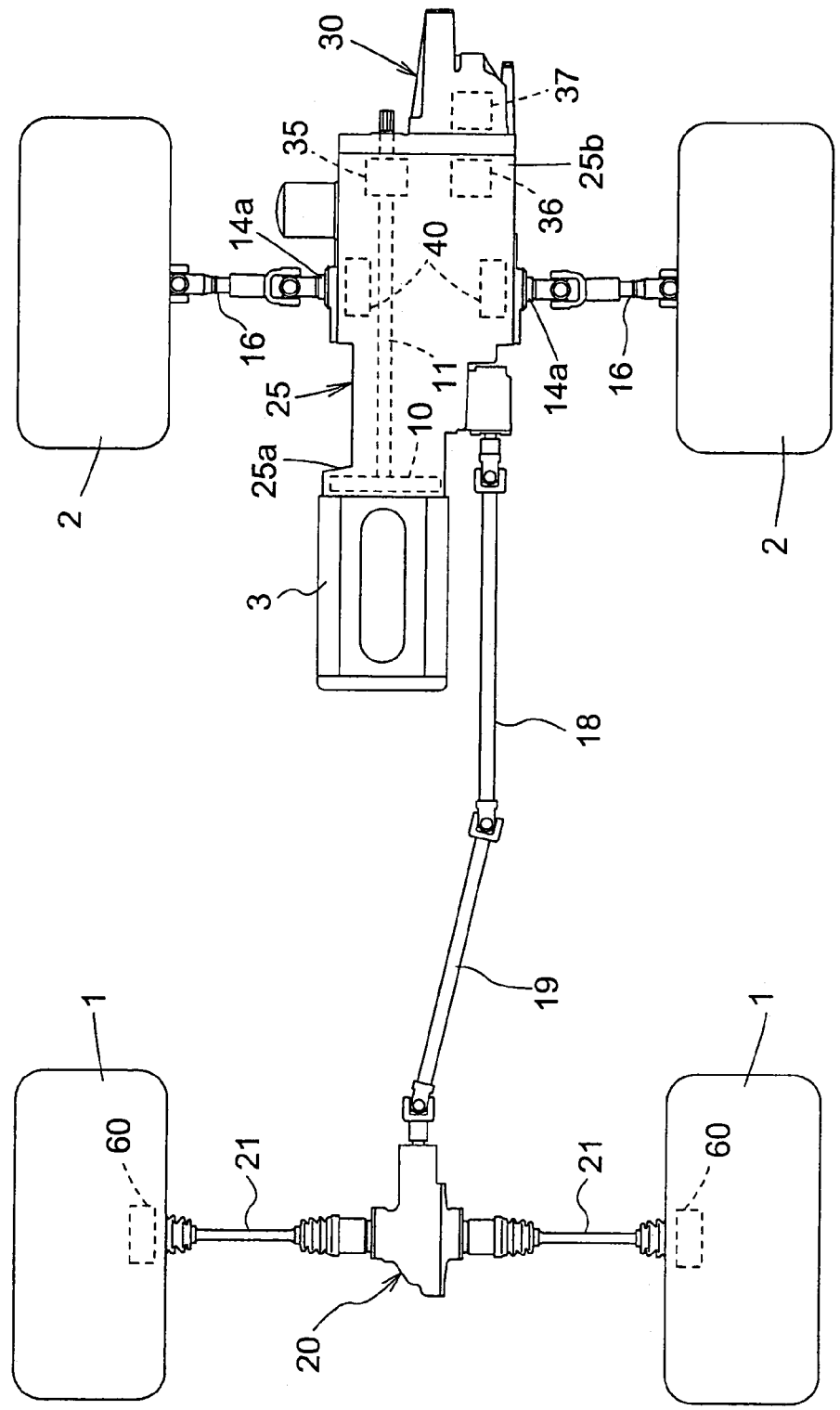
FIG. 4 is a plan view of a traveling transmission apparatus.
Figure 5:
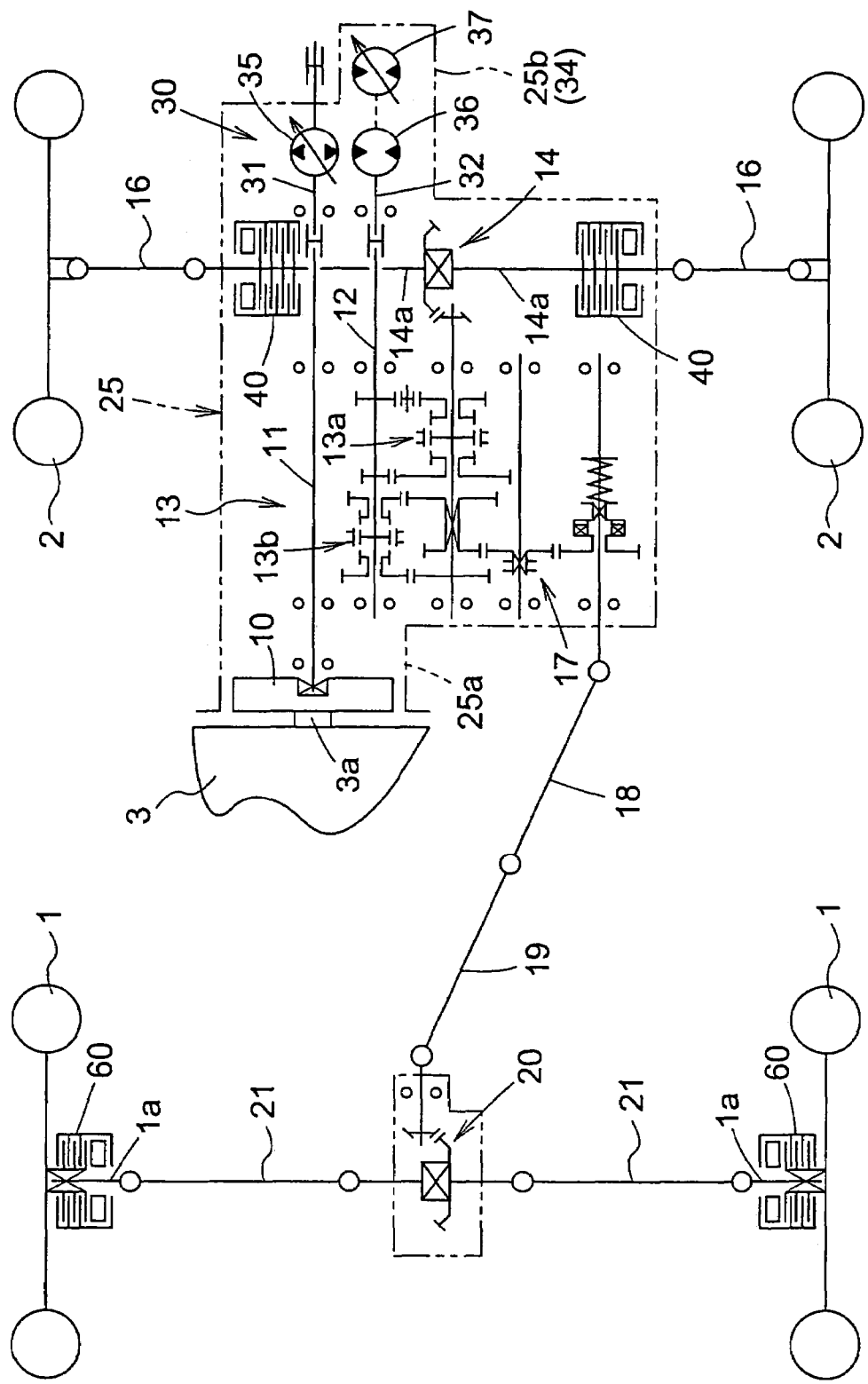
FIG. 5 is a schematic of the traveling transmission apparatus.

The power from the engine 3 is transmitted to the front and rear wheels 1, 2 via the traveling transmission apparatus shown in FIGS. 4 and 5.

More particularly, power from an output shaft 3a mounting a flywheel 10 disposed rearwardly of the engine 3 is transmitted via a rotary shaft 11 to an input shaft 31 of a hydrostatic stepless change-speed unit (to be referred to as "HST" hereinafter) 30. And, output from an output shaft 32 of this HST 30 is inputted via a rotary shaft 12 to a gear transmission mechanism 13. An output from this gear transmission mechanism 13 is inputted to a rear-wheel differential mechanism 14, which in turn provides a power from its right and left output shafts 14a via respective rotary shafts 16 to the rear wheels 2. The gear transmission mechanism 13 provides a further output for driving the front wheels. This output is transmitted via a clutch mechanism 17 engaging/disengaging power transmission to the front wheels 1 and rotary shafts 18, 19 to a front-wheel differential mechanism 20, which in turn provides right and left powers to the front wheels 1 via respective rotary shafts 21.

Figure 6:
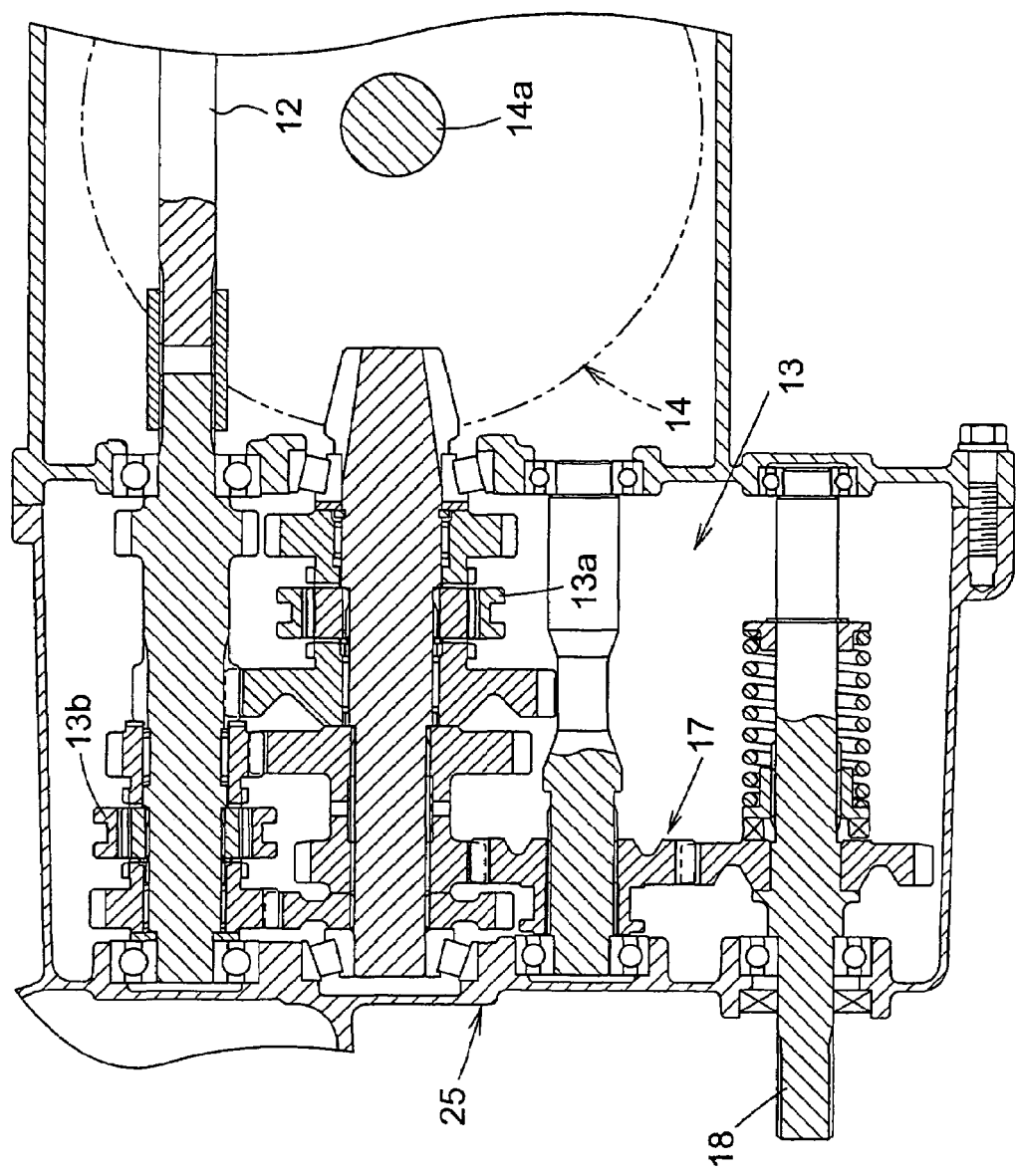
FIG. 6 is a section view of a gear transmission mechanism.

The gear transmission mechanism 13, the rear-wheel differential 14, the clutch mechanism 17 and the rotary shafts 11, 12 are all accommodated in a transmission case 25 which is coupled to the rear of the engine 3 via a flywheel case 25a thereof. As shown in e.g. FIG. 6, the rear-wheel differential mechanism 14 is disposed at a position located more rearward than the gear transmission mechanism 13 relative to the vehicle body.

In response to a shift operation of a shift gear 13a, the gear transmission mechanism 13 selectively provides a forward drive condition in which the output from the HST 30 is switched to the forward traveling side and a reverse drive condition in which the output from the HST 30 is switched to the reverse traveling side. Further in response to a shift operation of a further shift gear 13b, the mechanism 13 selectively outputs the forward driving power in two steps of high and low speeds.

Figure 7:
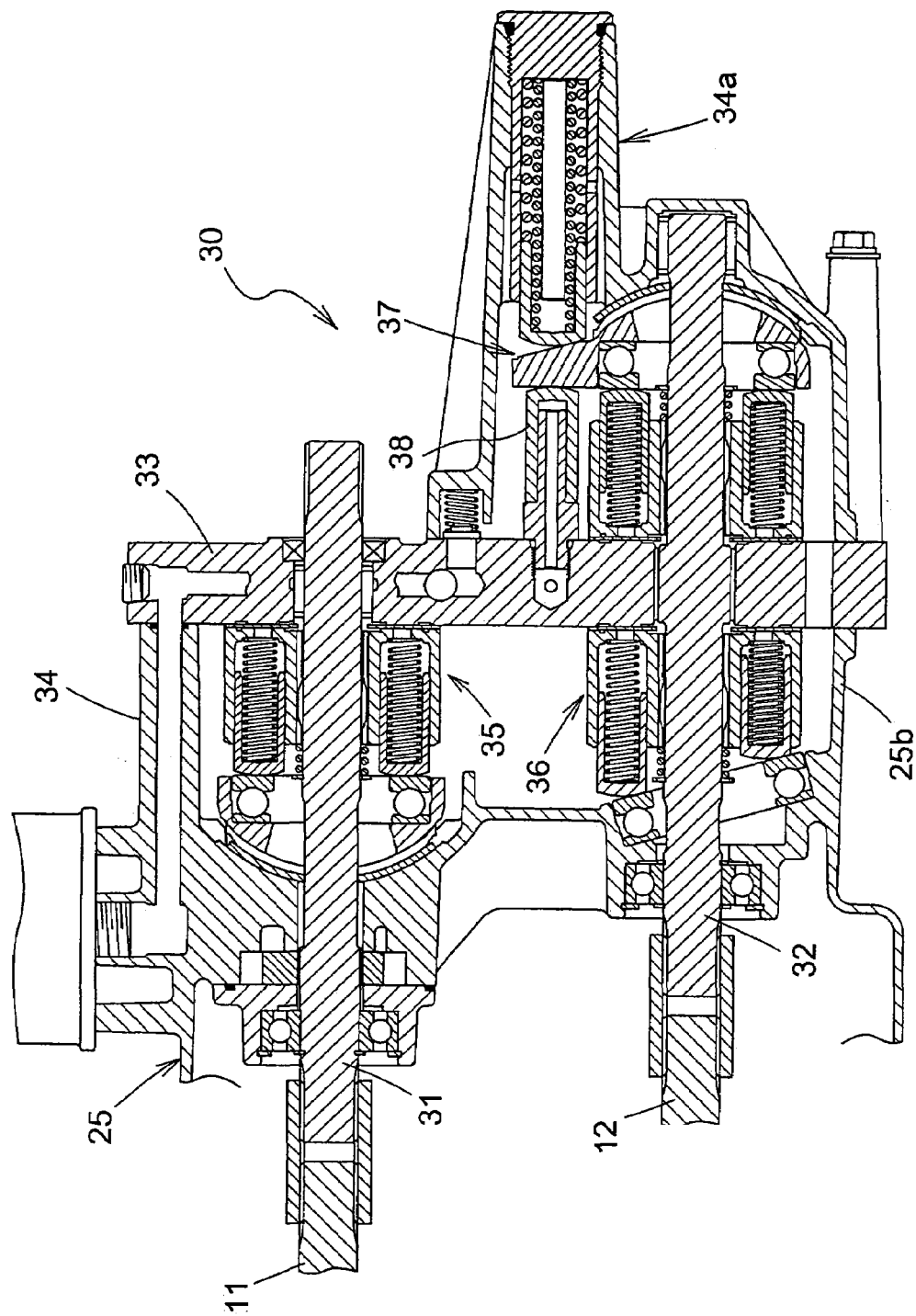
FIG. 7 is a section view of a stepless change-speed unit.

As shown in e.g. FIGS. 4 and 7, the HST 30 is disposed rearwardly of the gear transmission mechanism 13 and rearwardly also of the right and left output shafts 14a of the rear-wheel differential mechanism 14.

Figure 8:
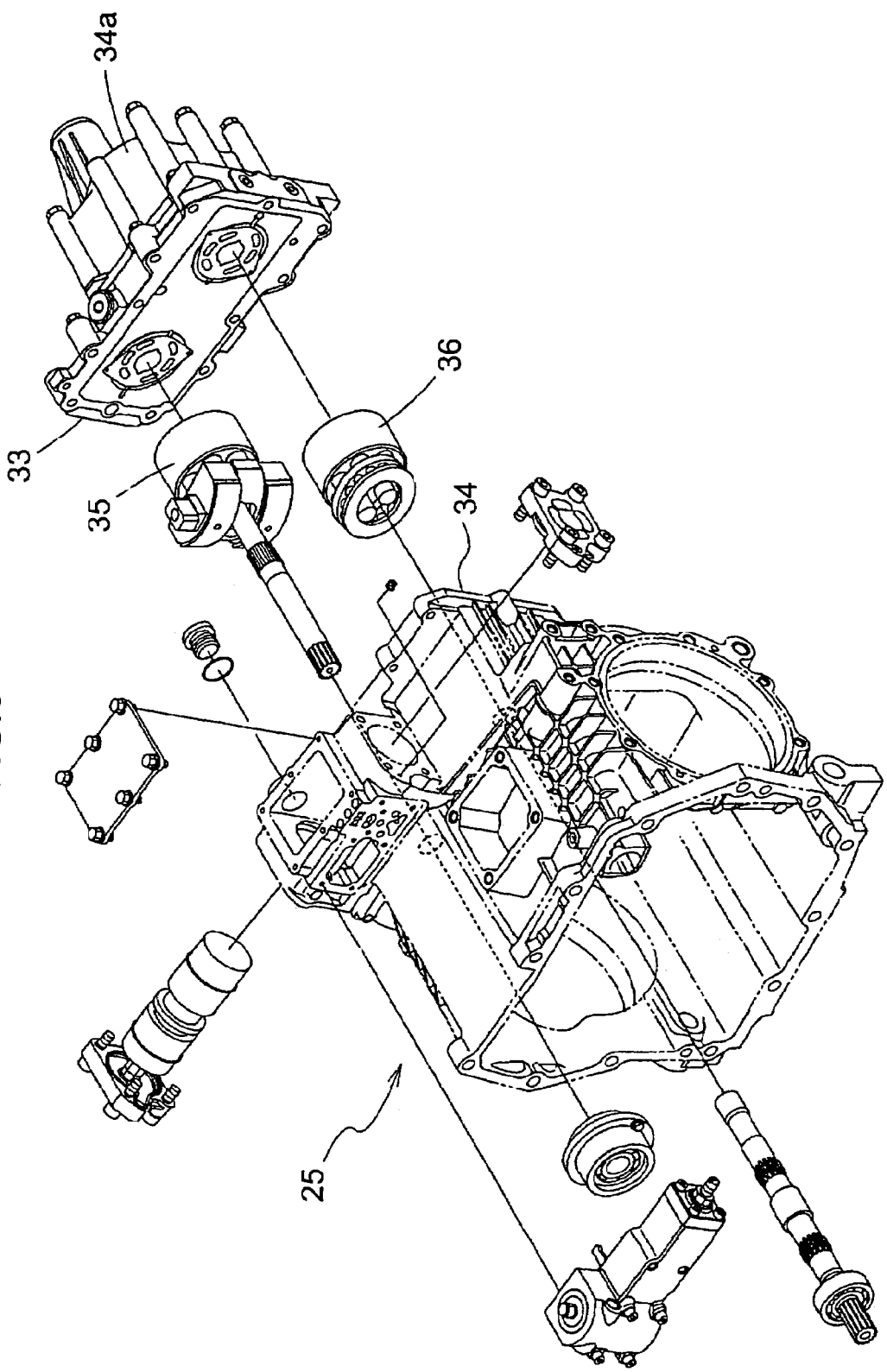
FIG. 8 is an exploded perspective view sowing a transmission case, a port block and the stepless change-speed unit.

As shown in FIGS. 7 and 8, the rear end portion of the transmission case 25 is formed as an HST case portion 34 for accommodating a portion of the HST 30. And, a port block 33 acting also as a lid for covering an rear end opening of the HST case portion 34 of the transmission case 25 is detachably secured to the rear end of the HST case portion 34. The HST 30 includes an axial plunger type variable displacement hydraulic pump 35 and an axial plunger type fixed displacement hydraulic motor 36 which are accommodated within the HST case portion 34 and disposed forwardly of the port block 33 relative to the vehicle body, and the HST 30 further includes an axial plunger type variable displacement hydraulic motor 37 which is disposed rearwardly of the port block 33 relative to the vehicle body. More particularly, the variable displacement hydraulic pump 35 and the fixed displacement hydraulic motor 36 are attached to the inner face of the port block 33, whereas the variable displacement hydraulic motor 37 is attached to the outer face of the port block 33.

Figure 9:
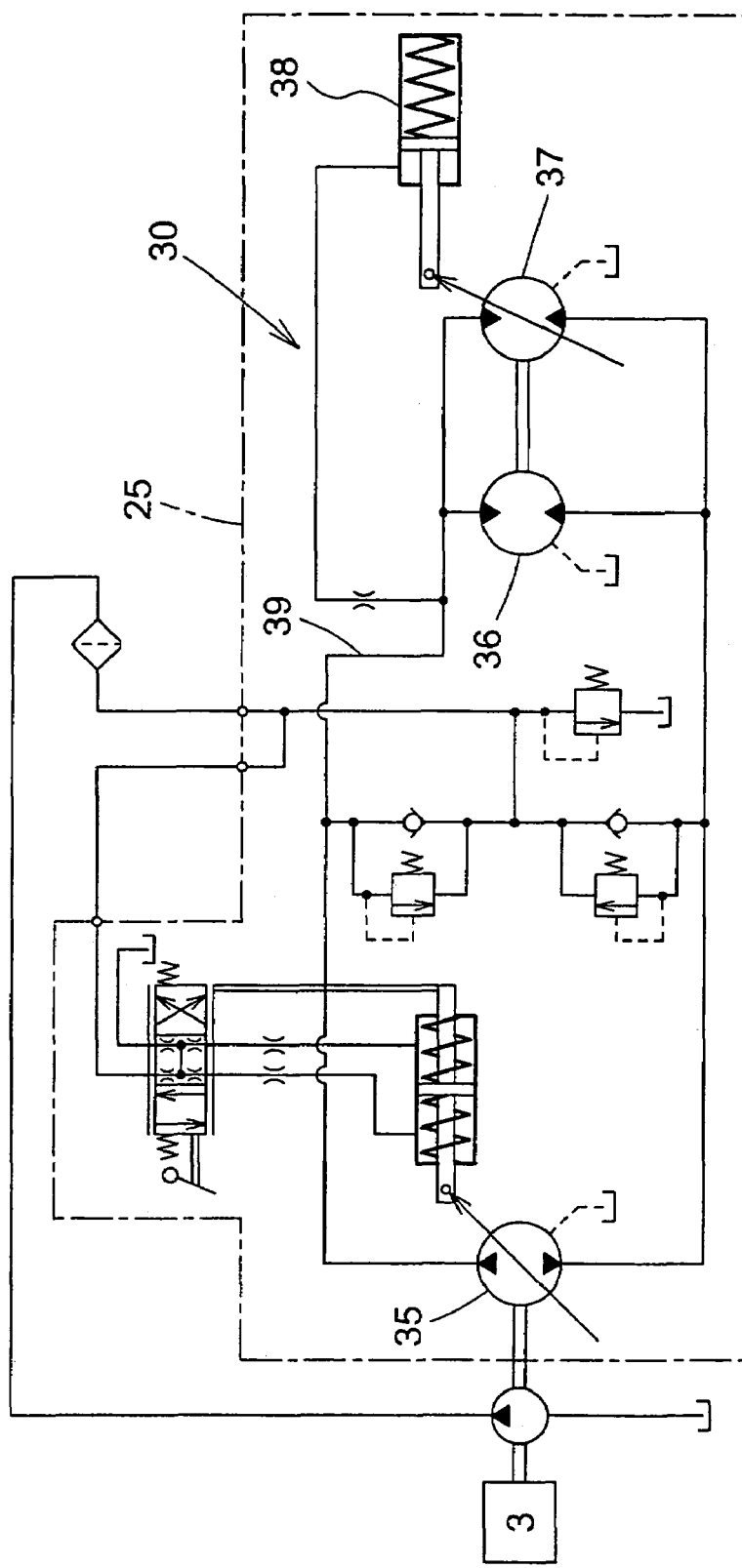
FIG. 9 is a hydraulic circuit diagram of the stepless change-speed unit.

The output shaft 32 of the HST 30 is used as the output shaft by both of the two hydraulic motors 36, 37. Further, by means of a motor switchover cylinder 38 disposed rearwardly of the HST case portion 34, the swash plate angle of the variable displacement hydraulic motor 37 is varied to switch over this hydraulic motor 37 between a drive position and a neutral position. As shown in FIG. 9, the port block 33 incorporates a drive oil passage 39 so that pressure oil from the hydraulic pump 35 is fed to the two hydraulic motors 36, 37 thereby to drive these motors 36, 37. When the oil pressure in the drive oil passage 39 exceeds a predetermined oil pressure, the motor switchover cylinder 38 is activated by a pilot pressure from this drive oil passage 39, thereby to automatically switch over the hydraulic motor 37 into its drive position. Whereas, when the oil pressure in the drive oil passage 39 is below the predetermined oil pressure, the cylinder 38 automatically switches over the hydraulic motor 37 to its neutral position.

With the above-described construction of the HST 30, the drive force transmitted from the engine 3 via the rotary shaft 11 is inputted to the input shaft 31 as the input shaft of the hydraulic pump 35, thereby to drive this pump 35; and also the pressure oil from this hydraulic pump 35 drives the hydraulic motors 36, 37, which motors 36, 37 in turn drive the output shaft 32, so that the drive force originated from the engine 3 is outputted from the output shaft 32 with appropriate stepless change in the speed thereof in association with corresponding variation in the swash plate angle of the hydraulic pump 35. Further, when the front/rear-wheel driving load applied to the output shaft 32 is below a predetermined load, the oil pressure in the drive oil passage 39 becomes lower than the predetermined oil pressure, so that the motor switchover cylinder 38 switches over the hydraulic motor 37 to its neutral position. As a result, the pressure oil from the hydraulic pump 35 is fed only to the fixed displacement hydraulic motor 36 of the two hydraulic motors 36, 37, so that this hydraulic motor 36 is driven at a high speed. Whereas, when the front/rear-wheel driving load applied to the output shaft 32 exceeds the predetermined load, the oil pressure in the drive oil passage 39 becomes greater than the predetermined value, so that the motor switchover cylinder 38 switches over the hydraulic motor 37 to its drive position. As a result, the pressure oil from the hydraulic pump 35 is fed in distribution to both of the motors 36, 37, so that these hydraulic motors 36, 37 are respectively driven at a low speed.

As shown in FIGS. 7 and 8, the HST case portion 34 for the HST 30 is forged at the same time as forging of the transmission case 25 so that this HST case portion 34 is formed integral with the rear of the portion 25b of the transmission case 25 which portion 25b accommodates the rear-wheel differential mechanism 14. And, the hydraulic pump 35 and the fixed displacement hydraulic motor 36 are accommodated in the HST case portion 34. Further, the port block 33 is detachably screw-connected to the HST case portion 34 so as to close the rearward (relative to the vehicle body) oriented opening of this HST case portion 34, and to the rear (also relative to the vehicle body) face of this port block 33, the variable displacement hydraulic motor 37 and the motor switchover cylinder 38 are bolt-connected and these motor and cylinder are covered by an HST auxiliary cover 34 also attached to the port block 33.

Incidentally, as shown in e.g. FIG. 5, inside the rear portion of the transmission case 25, there are provided a pair of right and left wet, multi-disc type rear-wheel bakes 40 and a front-wheel brake 60 is mounted on the axle 1*a* of each of the right and left front wheels 1, 1.

[Other Embodiments]

The foregoing embodiment employs the particular type of HST 30 including the two hydraulic motors 36, 37. Instead, the present invention may be applied also to a different type of HST including only either one of the variable displacement type hydraulic motor and the fixed displacement type hydraulic motor. Further, the invention may employ any other stepless change-speed unit than the HST.

The invention claimed is:

1. A traveling transmission apparatus for a work vehicle, comprising:
   a stepless change-speed unit receiving power from an engine;
   a gear transmission mechanism receiving power from the stepless change-speed unit and disposed rearwardly of the engine;
   a rear-wheel differential mechanism receiving power from the gear transmission mechanism and disposed rearwardly of the engine; and
   a transmission case accommodating the gear transmission mechanism and the rear-wheel differential mechanism and coupled to the rear of the engine;
   wherein the stepless change-speed unit is disposed rearwardly of the gear transmission mechanism and rearwardly also of an output shaft of the rear-wheel differential mechanism;
   the stepless change-speed unit being constructed as an HST including one hydraulic pump and first and second hydraulic motors;
   a port block for the HST being detachably secured to an end of a rear opening of the transmission case for closing this opening, the hydraulic pump and the first hydraulic motor being attached to an inner face of the port block the second hydraulic motor being attached to an outer face of the port block.

2. The apparatus of claim 1, wherein an auxiliary cover is attached to the outer face of the port block for covering said second hydraulic motor.

3. The apparatus of claim 1, wherein said first hydraulic motor is a fixed displacement hydraulic motor and said second hydraulic motor is a variable displacement hydraulic motor.

4. The apparatus of claim 3, wherein an output shaft of said HST extends from this HST to said gear transmission mechanism, wherein
   when a load applied to the HST output shaft is below a predetermined load, said second hydraulic motor is in its neutral position; and
   when said load exceeds the predetermined load, said second hydraulic motor is switched over to its drive position.

5. A traveling transmission apparatus for a work vehicle, comprising:
   a stepless change-speed unit receiving power from an engine;
   a gear transmission mechanism receiving power from the stepless change-speed unit and disposed rearwardly of the engine;
   a rear-wheel differential mechanism receiving power from the gear transmission mechanism and disposed rearwardly of the engine; and
   a transmission case accommodating the gear transmission mechanism and the rear-wheel differential mechanism and coupled to the rear of the engine,
   wherein the stepless change-speed unit is disposed rearwardly of the gear transmission mechanism and rearwardly also of an output shaft of the rear-wheel differential mechanism; and
   the stepless change-speed unit being constructed as an HST including one hydraulic pump and a first hydraulic motor attached to a front face of a port block, and a second hydraulic motor attached to a rear face of the port block, said second hydraulic motor being a variable displacement hydraulic motor,
   wherein an output shaft of said HST extends from this HST to said gear transmission mechanism,
   wherein when a load applied to the HST output shaft is below a predetermined load, said second hydraulic motor is in its neutral position, and
   wherein when said load exceeds the predetermined load, said second hydraulic motor is switched over to its drive position.

6. The apparatus of claim 5, wherein said first hydraulic motor is a fixed displacement hydraulic motor.

\* \* \* \* \*